PROGRAM-CONTROLLED ELECTRONIC DATA-PROCESSING SYSTEM

Original Filed Feb. 25, 1959 6 Sheets-Sheet 1

INVENTOR.
H. DREYER-R. BASTEN-G. PORST

BY Robert Harding Jr.
ATTORNEY

PROGRAM-CONTROLLED ELECTRONIC DATA-PROCESSING SYSTEM

Original Filed Feb. 25, 1959 6 Sheets-Sheet 2

INVENTOR.
H. DREYER-R. BASTEN-G. PORST

BY Robert Hardy Jr.
ATTORNEY

PROGRAM-CONTROLLED ELECTRONIC DATA-PROCESSING SYSTEM

Original Filed Feb. 25, 1959 6 Sheets-Sheet 5

INVENTOR.

H. DREYER-R. BASTEN-G. PORST

BY

Robert Harding Jr.

ATTORNEY

PROGRAM-CONTROLLED ELECTRONIC DATA-PROCESSING SYSTEM

Original Filed Feb. 25, 1959 6 Sheets-Sheet 4.

INVENTOR.
H. DREYER-R. BASTEN-G. PORST
BY Robert Harding Jr.
ATTORNEY.

PROGRAM-CONTROLLED ELECTRONIC DATA-PROCESSING SYSTEM

Original Filed Feb. 25, 1959 6 Sheets-Sheet 5

INVENTOR.
H. DREYER-R. BASTEN-G. PORST
BY Robert Harding Jr
ATTORNEY

PROGRAM-CONTROLLED ELECTRONIC DATA-PROCESSING SYSTEM

Original Filed Feb. 25, 1959 6 Sheets-Sheet 6

INVENTOR.
H. DREYER-R. BASTEN-G. PORST
BY Robert Harding Jr.
ATTORNEY.

United States Patent Office

Re. 27,285
Reissued Feb. 15, 1972

27,285

PROGRAM-CONTROLLED ELECTRONIC DATA-PROCESSING SYSTEM

Hans-Joachim Dreyer, Korntal, Rolf Basten, Hirschlanden, and Gottfried Porst, Konstanz, Germany, assignors to International Standard Electric Corporation, New York, N.Y.

Original No. 3,174,136, dated Mar. 16, 1965, Ser. No. 795,479, Feb. 25, 1959. Application for reissue Mar. 16, 1967, Ser. No. 629,350
Int. Cl. G06f *13/00*
U.S. Cl. 340—172.5 27 Claims

Matter enclosed in heavy brackets [ ] appears in the original patent but forms no part of this reissue specification; matter printed in italics indicates the additions made by reissue.

*ABSTRACT OF THE DISCLOSURE*

*An electronic data processing system is described having a plurality of partial storages and a plurality of working units which are adapted to operate upon data signals of the kind stored in the partial storages. Interposed between the working units and the partial storages is means for establishing selective transfer connections therebetween. A central program control unit is cyclically operative to examine program instructions stored in a predetermined one of the partial storages and to set up a transfer connection between at least one of the partial storages and working units according to each examined program instruction. Associated with each of the working units and under the control of the central control unit is means for seizing and independently maintaining control of each transfer connection set up by the control unit while the control unit proceeds to execute the next examination cycle of program instruction.*

This invention relates to an electronic data processing system, comprising a central control unit serving the program-control purposes as well as a working storage, in which there are provided several data processing units, such as calculator and sorting units, as well as different backing storage units, such as magnetic-drum storage devices and magnetic-tape storage devices, and several input and output units.

In systems of the above type it is often desirable to simultaneously carry out various operations. Thus, during the performance of a calculating program, the preparation of the next program is supposed to be carried out, in particular the reception and conversion of input data, which are supplied by relatively slow-operating input devices, e.g. by a tape transmitter. The output or feeding-out of the results, as obtained during the preceding calculating program, e.g. via punched cards or printing devices, is supposed to be effected together with these above mentioned operations.

In one conventional system of this type, the individual function elements are provided with separate control or program registers and are adapted to operate substantially autonomously. The controller of such systems is effected via a central unit comprising a high-speed memory or quick-access storage device and a program distributor. This program distributor serves to transfer the individual instructions (orders) to the individual function elements (parts of the unit) and, if so required, to automatically carry out certain order conversions. Furthermore, the distributor is adapted to connect the various instruction circuits with each other.

Although, in the conventional electronic system, it is substantially possible to simultaneously perform and control several operations, there arise considerable difficulties when reducing it to practice, especially on account of the fact that the expense for the program supervision is multiplied. Above all in such a case additional supervisory arrangements or instructions are required which are supposed to prevent a mutual overtaking of individual partial programs. In order that the central unit can perform its supervising function, it is further necessary to provide a special logical calculator unit by which certain control instructions are analysed or converted respectively. Also, to this end, an additional investment in circuitry is required. Altogether, from the interlacing of the programs at a simultaneous operation of different function units, numerous supervising and controlling operations result, all of which lead to a complicated construction of the control unit which is then susceptible to interferences.

The invention is based on the problem of improving the construction of a program-controlled electronic system in such a way that the simultaneous performance of different programs or operations, sorting passes, and the like, is enabled, without effecting the controlled performance of the individual programs by reciprocal waiting times. It has been found that one of the major difficulties is the access to the high-speed or quick access storage, as provided at the central point, as well as in the access to the buffer storages of the individual function or data processing units.

According to the invention, these disadvantages are avoided in the electronic system comprising a central control unit serving program-control purposes, as well as a working storage, and one or more data-processing units, backing-storage units, and input-output units, in that the working storage is subdivided in several partial storage devices, and in that an electronic crossbar switch is provided for establishing the simultaneously existing connections between various partial storages and various units. In a system according to the invention it is appropriate to provide each of the units with a local sequence-control device of its own, capable of being marked in accordance with the desired function sequence, and to provide each of the partial storage devices with an access-control device of its own capable of being set in accordance with the desired addresses. In this case the central control unit is appropriately arranged in such a way that it will control the establishment of the connections, that it will set the access control of the respective partial storage device, and will release the desired function sequence by marking the sequence control in the respective unit.

The employment of the electronic crossbar switch with a system according to the invention enables the simultaneous connection between various units and various partial storage devices of the working storage. In this way special buffer storages for the individual units are no longer required. Of course, it may become necessary, e.g. for speed adaptation purposes, to provide some of the units with an input register which is e.g. designed as a shift register. However, such input registers which are merely required for functional reasons, cannot be actually regarded as buffer storages. In fact, larger types of buffer storages are provided whenever the respective unit is supposed to be engaged for a longer time on the processing of a large amount of information data, and is supposed to work on its own during this time, as is the case e.g. with printing units. Furthermore, buffer storages have to be provided for the blockwise conversion of informations between two units which cannot be operated synchronously. Additional transmission times are required for the conversion of informations into and from such buffer storages.

These losses of time are also avoided by the employment of the crossbar switch, because, by means of a simple switchover operation, the partial storage devices can be nterchanged at will among each other. For example, if . greater amount of informations is supposed to be orted, then the contents of a magnetic-tape storage device an be transferred en bloc to individual partial storage levices, and can be simultaneously sorted en bloc from ne of these partial devices via a sorting unit into another partial storage device. Simultaneously, however, nother partial storage device, in connection with a calulator units and under the control of the control unit, an perform a calculating program.

In order to avoid double connections at the intersecting oints of the crossbar switch, the system according to the ıvention is appropriately designed in such a way that the ontrol unit comprises a sequence control of its own, as vell as a sequence control device composed of blocking nd unblocking circuits, that the sequence control with espect to each step of the program, passes through a estricted sequence of circuit conditions, of which each ne is assigned to one operating cycle, and that said equence-control device, being controlled by return indiations derived from the position of the crossbar switch, upervises the sequence of the operating cycles. For conrolling the sequence-control circuit there is appropriately ised a return indicating system which is connected with ıe control system of the crossbar switch.

For this reason, in the system according to the inven-ion, a connecting control and a connecting control circuit re provided for the controlling of the crossbar switch. 'hese arrangements cooperate in such a way with the con-ol unit that the sequence-control circuit will only effect he unblocking of an output for setting the access control ı the respective partial storage device, for effecting the onnecting-through of the connection, and for marking he sequence-control of the respective unit when the unit, s well as the partial storage device, which are indicated ı the respective program step by the contents of the nstruction register, have not already been connected with nother partial storage device or with another unit. Furıermore, and in accordance with the invention, the arangement is made in such a way that the blocking effect f the sequence control circuit will not only become effeive when the marked unit and the partial storage device vhich is assigned thereto are connected with each other, ıut the marking will also be released or effected whenever he sequence control of the respective unit is still marked, hat is, when the sequence control in this particular unit s still performing further operating cycles without a conıection with one of the partial storage devices being equired.

By the cooperation of the connecting control and the onnecting control circuit on one hand, and the sequenceontrol circuit of the control unit on the other hand, a nutual overlapping of different programs is reliably voided. As long as one of the units, together with the ıartial storage device assigned thereto performs a proram or part of a program, or else as long as it alone perorms a program or part of a program, both the connectıg and the sequence-control circuit have such a blocking ffect that the performance of this program cannot be isturbed by the program running in other parts or secions of the system.

The above mentioned and other features and objects of his invention will become more apparent and the invenion itself will be best understood by reference to the folowing description of an embodiment of the invention ıken in conjunction with the accompanying drawings, in vhich:

Figure 1:
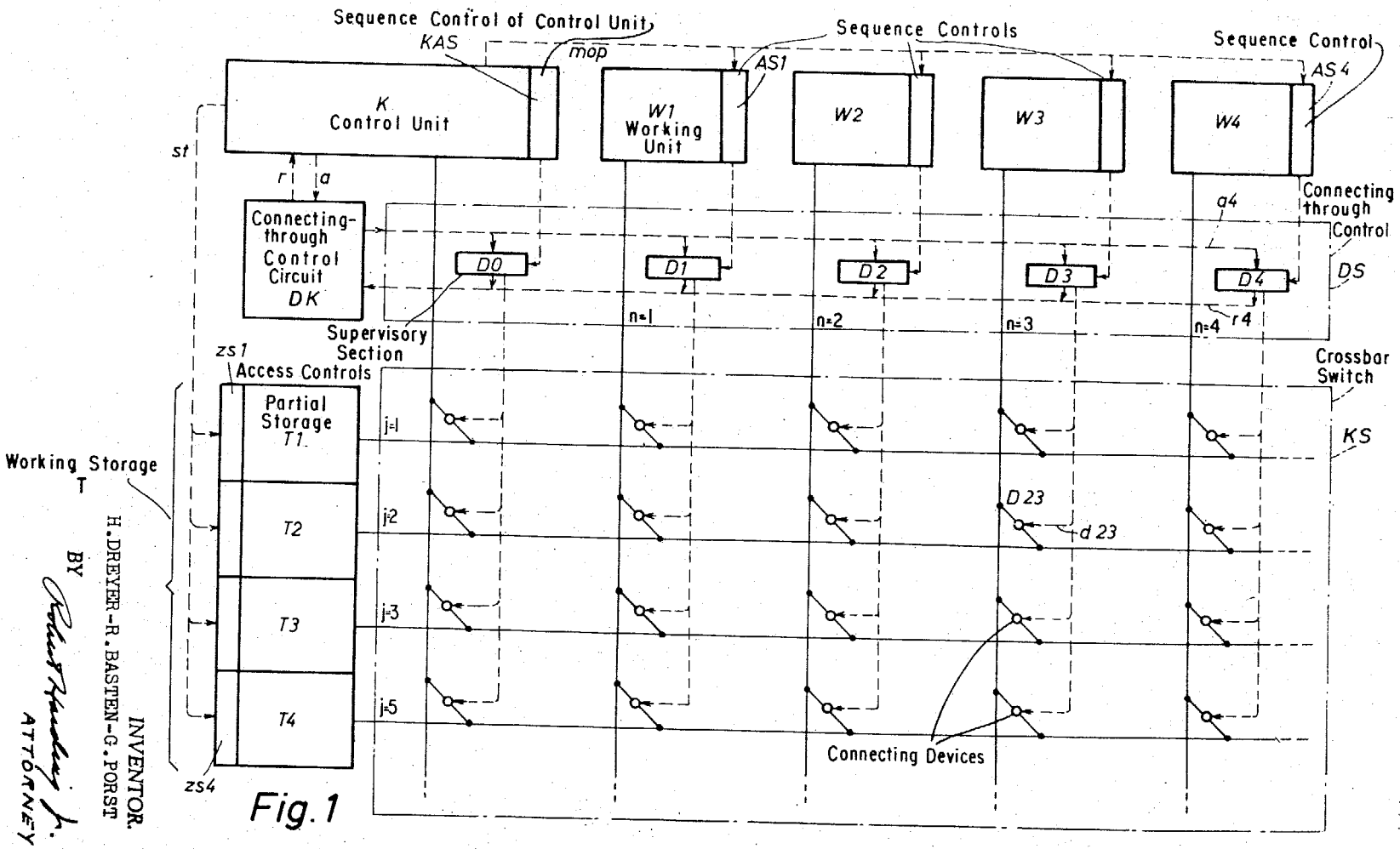
FIG. 1 shows the block diagram of a system according o the invention comprising one control unit, four units nd four partial storage devices.

The construction of an electronic system according to the invention is shown in FIG. 1. In this FIG. 1 four units W1 through W4 are provided, as well as one working storage which is subdivided in four partial storages T1 through T4. Both the partial storages and the units are connected with each other by means of a crossbar switch KS. Line conductors are connected with the partial storage devices, and the column conductors of the crossbar switch are connected with the units. The connecting-through from the line or horizontal conductors to the column or vertical conductors is effected with the aid of connecting devices Djn, which are numbered in accordance with the intersecting points of the crossbar switch. In these references the letter j indicates the line, and the letter n the column. Thus, for example, the connecting device D23 connects the partial storage device T2 with the unit W3. The marking of the connecting-through devices is effected by the connecting-through control device DS. This connecting control comprises one supervisory section for each unit, e.g. for the unit W4, the supervisory section D4. These supervisory sections are connected via the connecting-through control circuit DK with the control unit K over several control input control leads a and return-indicating leads r.

A separate sequence control is provided for each of the units, denoted in FIG. 1 for W1 by AS1, etc., for W4 by AS4, and for the control unit itself by KAS. The sequence controls are connected with the control unit via the marking leads mop.

As will be seen from FIG. 1, one access control ZSj is assigned to each partial storage device Tj. For instance ZS4 is assigned to the partial storage device T4. The control unit is connected with the access control of the individual partial storage over control leads st.

In FIG. 1 only one horizontal or line conductor is shown for each partial storage, and only one column or vertical conductor for each unit. Fundamentally, such a limitation to only one transmission line is possible. However, when transmitting binary informations, it will be necessary to transmit both statements, the yes-statement as well as the no-statement, for instance, by means of positive and negative impulses. When employing self-clocking writing and reading systems, the transmission may also be effected by impulses having one polarity only; this, however, is entailed by the limitation to a given pulse-repetition frequency.

For synchronizing purposes it is favorable to connect the units and the partial storages not only by means of an information transmission line, but also by means of a transmission path for clock pulses. For this reason it is appropriate to design the crossbar switch as a multiswitch serving the connecting-through of a clock-pulse transmission line and of at least one information transmission line. One favorable type of embodiment is shown in the right-hand half of FIG. 2. At one intersecting point of the crossbar switch, which is designed as a triple switch, the information output line wa of a unit is connected with the information-input line te of a partial storage, and the information-output line ta of a partial storage is connected with the information-input line we of a unit, and the clock-pulse transmission line wt of a unit is connected with the clock-pulse transmission line tt of a partial storage device.

Figure 2:
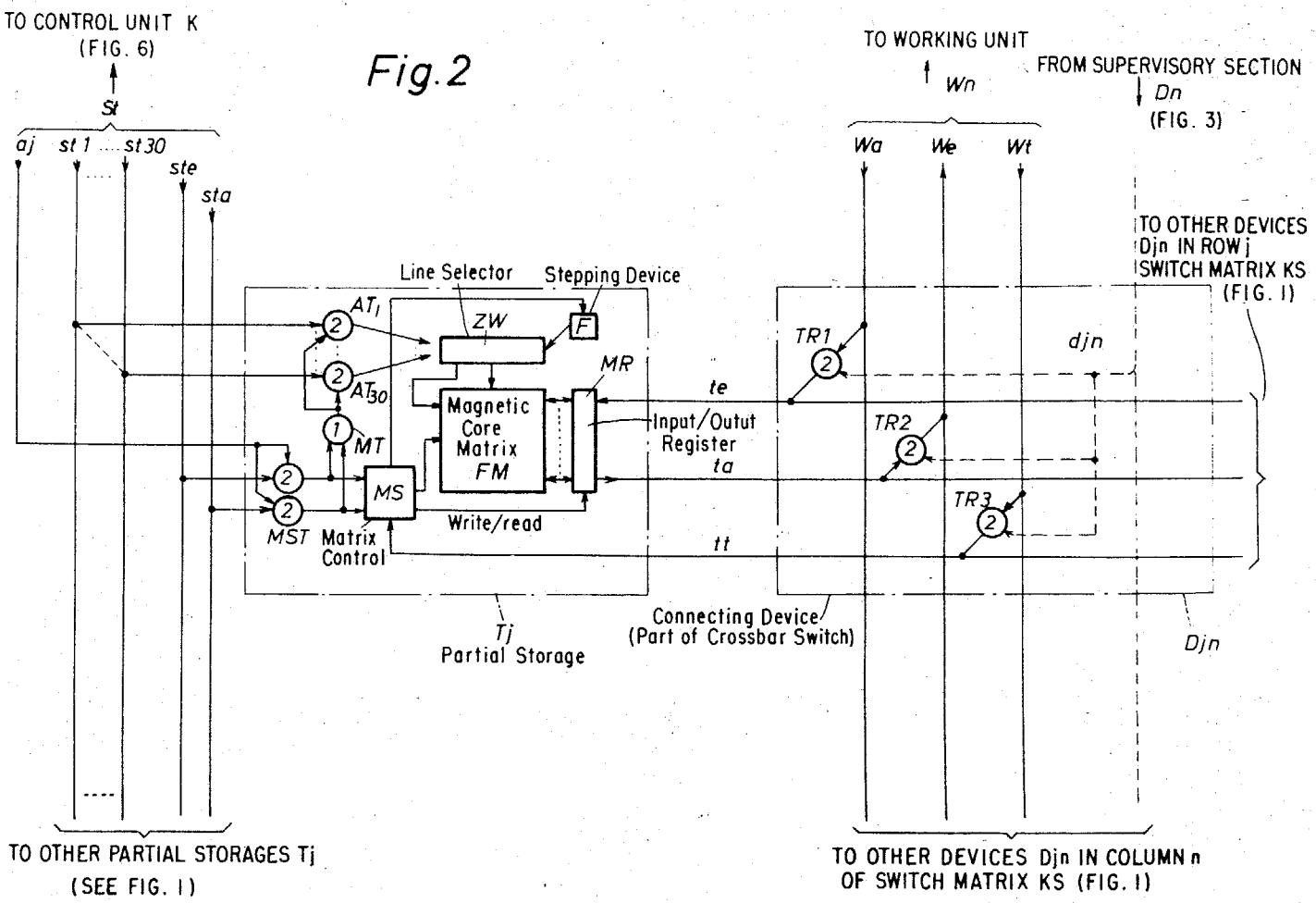
FIG. 2 shows the basic circuit diagram for a partial torage device with an access control and the associating oordinate lines with connecting devices.

In FIG. 2 the connecting device Djn connects the line conductors of the partial storage Tj with the column conductors of the unit Wn. At the intersecting points of line and column conductors which are assigned to each other the connecting gates TR1, TR2 and TR3, e.g. transistors, are connected, and the connection is established over these whenever a corresponding marking is applied to the marking line djn of the connecting device Djn. The gate TR1 is adapted to connect wa with te. The gate TR2 is adapted to connect we with ta and likewise TR3 is adapted to connect the clock lines wf and tt.

The left-hand half of FIG. 2 shows the construction of a partial storage Tj and of the associated access control. A magnetic-core matrix FM may be used as the actual storage device. At the input/output side, this matrix is connected with an input/output register MR, and in the example under consideration, the information to be transmitted can either be fed in series to this register or may be taken off therefrom. Controlling of the information transmission is performed by the matrix control MS which is synchronized by clock pulses transferred via the lines wt and tt.

The matrix control device MS is capable of being set via the input gates MST, either to the position "Writing" or "Reading." Corresponding set pulses are applied from the control unit via the control leads ste or sta respectively.

As has already been shown in FIG. 1, each of the partial storages is provided with an access control. This access control (see FIG. 2) consists of a line selector ZW and of the gate circuits AT, MT, and MST. In addition thereto a stepping device F is connected with the line selector.

According to the invention, the access control of the partial storages is designed in such a way that the line selector, in accordance with the marking of the input control leads st1 . . . st30, is only capable of being set when the calling line aj, which is assigned to the partial storage, has been marked, and when a setting pulse ste or sta is being applied from the sequence control of the control unit. (The sequence-control of the control unit is denoted in FIG. 1 by KAS. The construction and the mode of operation thereof will be described hereinafter with reference to FIG. 6.

In the exemplified embodiment, according to FIG. 2, thirty input control leads are provided for the selection of one thousand different lines. These control leads correspond to a three-digit decimal address. Of course, the access control can also be modified in such a way that the line selector is capable of being set by set pulses which are applied in series, and which are fed-in via one or several control leads. On account of this, it is possible, by making sacrifices with respect to time, to reduce the number of the necessary control leads.

In the arrangement, according to FIG. 2, two AND gates, represented by input gating circuit MST, are provided, which, upon marking of the calling line aj, are only unblocked or conductive when a set pulse is applied via one of the lines ste or sta, respectively. The set-pulse transmission lines, just like the input control leads, are connected with the input gating circuits of all partial storages. However, only the input gating circuit MST of that partial storage Tj which is called during a step of the program can open during that step. For example, if MST in FIG. 2 is opened, then thereby, and via the OR-gate MT, the input gate circuits AT, which are designed as AND-gates, will be unblocked, and the line selector will be set in accordance with the marking of the control leads.

Likewise only the matrix control of the called partial storage can be set to the position "Reading" or "Writing."

After the line selector and the matrix control have been set, the respective partial storage is ready to operate. By means of a first clock pulse, applied via the clock-pulse transmission line to the matrix control, the desired information (the location of which is designated by the position of the line selector) is transmitted in parallel from the magnetic-core matrix FM to the input/output register MR at the reading from the storage and is thereupon called up in series from this register by means of further clock pulses. A final clock pulse (or else one of the aforementioned clock pulses) is likewise applied via the matrix control to the stepping device F, which is adapted to step on the line selector to the next successive address. In the case of a series interrogation or reading of the matrix the input/output register MR may be dispensed with.

Those skilled in the art will appreciate that while the blocks MS, ZW, F, and MR are only described schematically above in terms of the functions performed thereby, the construction of each such block amounts to what would be considered a routine engineering design detail. Consider first the function of the blocks ZW and F. As explained above the block ZW is initially set by signals translated via lines st1 . . . st30, which signals designate the first storage word location in the matrix FM to be coupled to the common in/out buffer register MR. As is further indicated above, following such initial setting of the line selector ZW, the selector is stepped along in rhythm with pulses arriving on line tt, to designate successive storage word locations in the matrix FM until the connection between the unit Wn and the partial storage Tj is broken. This is, of course, a quite simple operation which is well understood by those who are knowledgeable in the construction of random access storage systems, and may be easily manifested, for example, by a 30 stage ring counter or a shift register, operating in conjunction with a suitably constructed pulsing device (F), which is actuated upon completion of each preceding transfer operation between the matrix FM and register MR, provided that the organization of FM is such that each word stored therein is selected by a signal on a single line.

Similarly, those knowledgeable in this art will also appreciate that the matrix control MS is a control circuit arranged to selectively translate reference timing signals on line tt into read or write drive signals which control the transfer of intelligence between the matrix FM and register MR, and upon termination of the drive signals, to forward a control impulse to the stepping device F. As the read/write drive circuitry for control of the transfer of information between matrix storage word locations and a common read/write register is well understood by those skilled in the art (note for example, FIGURES 8–13a, "Digital Computer Components and Circuits," R. K. Richards, page 383) the details of MS have been omitted.

Figure 3:
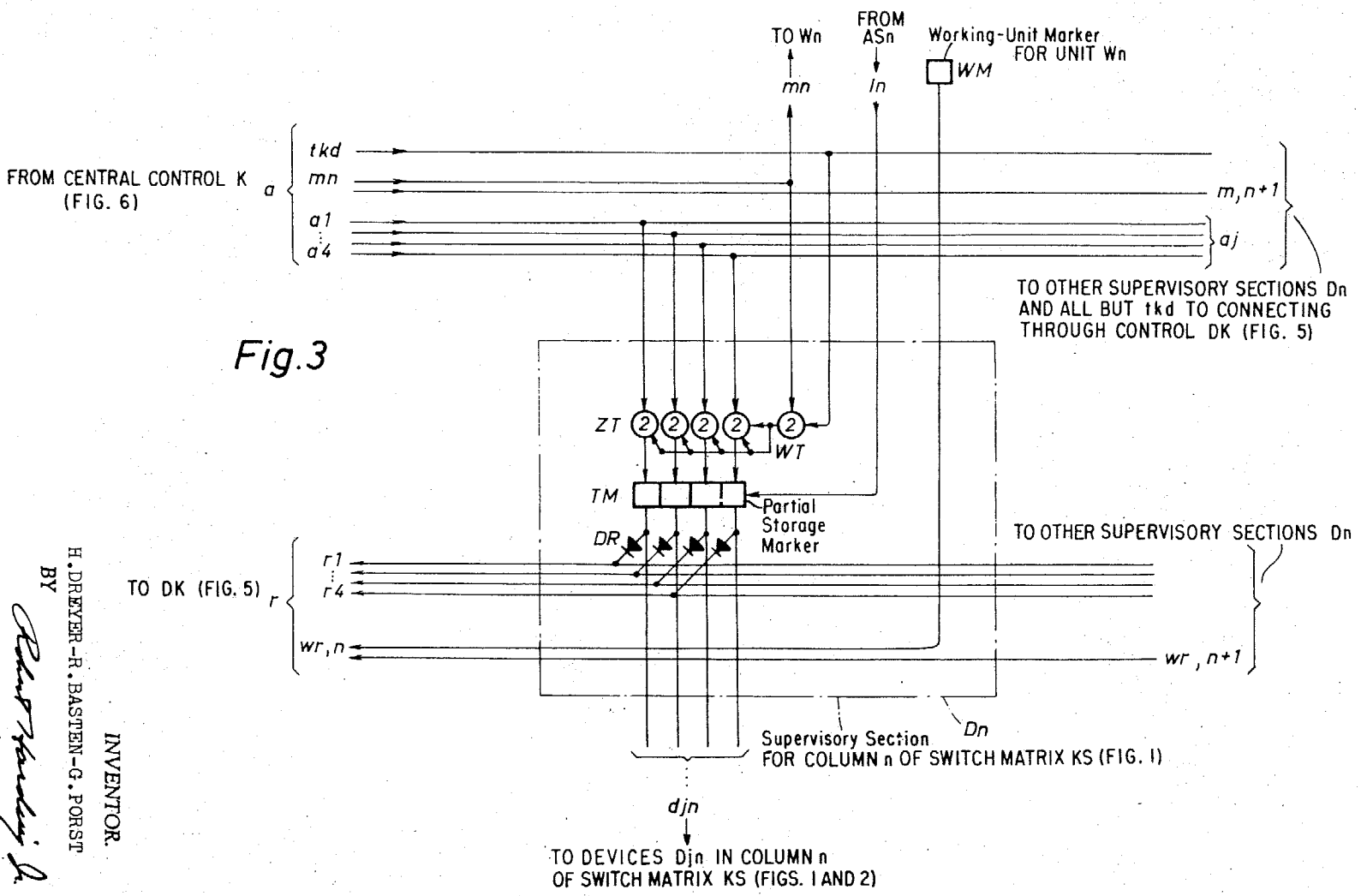
FIG. 3 shows a supervisory unit of the connecting control with a partial storage marker and the associating controlling and return indicating lines.

In FIG. 3 the construction of a supervisory section Dn is shown. One such supervisory section is assigned to each of the units and is constructed of input-gating circuits ZT and WT and a partial storage marker register of bistable elements TM, in such a way that the partial storage marker, via input-control leads a1 through a4, can only be set by the feeding-in of a sequence-clock pulse tkd from the control unit when a calling line mn of the associating unit Wn is marked at the same time, and in such a way that the outputs of the partial storage marker are connected with the control leads djn of the connecting devices Djn (j=1–4). The mode of operation of the input-gating circuits within the supervisory section Dn, corresponds to the mode of operation of the access control of the partial storage. Instead of the line selector, the partial storage marker is used as the storage means in this case. The required storage capacity, however, is relatively small in accordance with the number of the partial storages. The markings of the lines a1 through a4 are stored in corresponding bistable stages of the partial storage marker register TM, upon opening or unblocking of the input-gating circuits.

Figure 4:
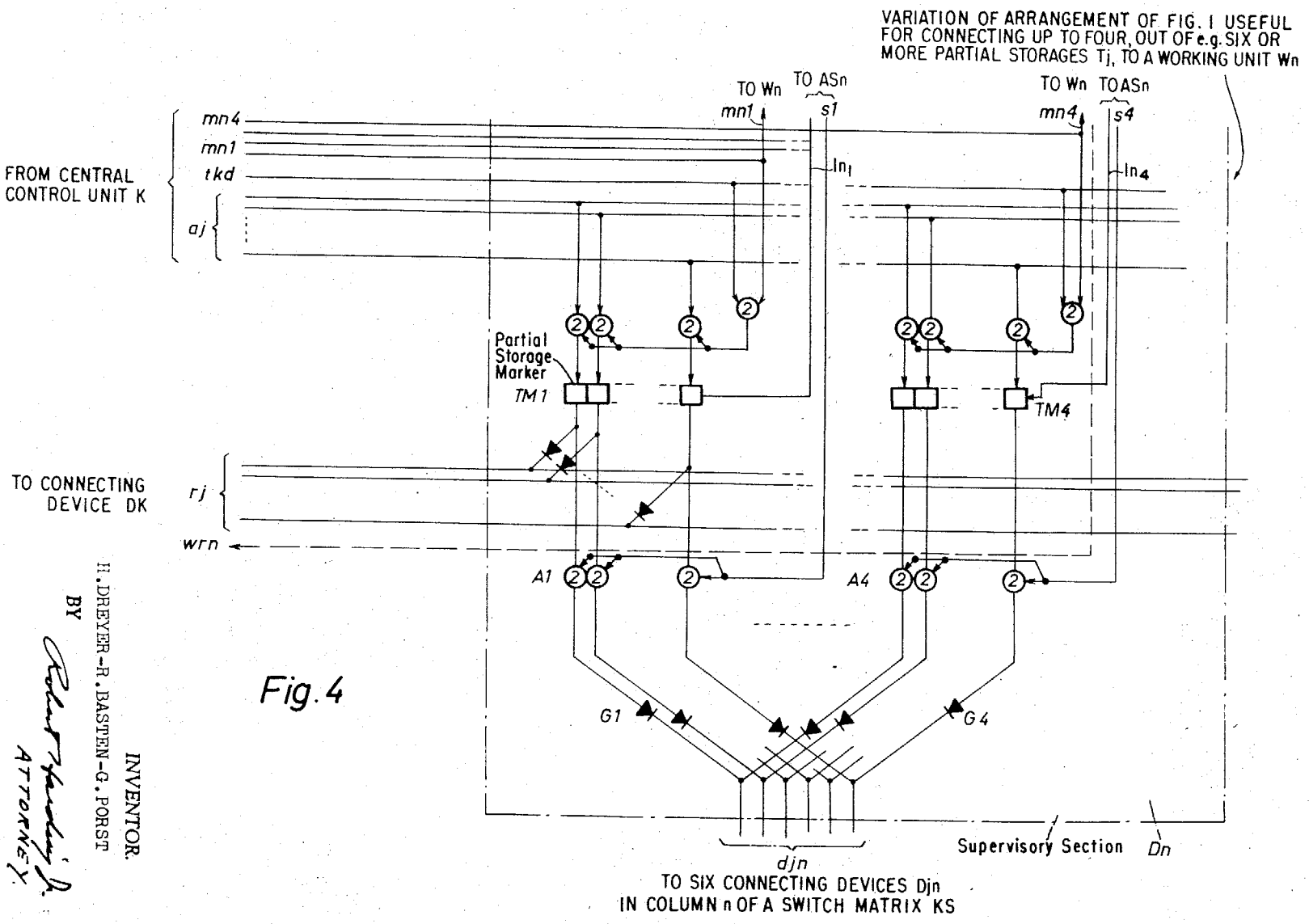
FIG. 4 shows a supervisory unit comprising several partial storage markers.

As may be noted with reference to FIGURE 4, where each working unit is connectable to as many as 4 partial storages, it would be impractical to provide only 4 partial storages for the entire system since that would defeat the purpose of the present invention. Accordingly, such a system should include a minimum of 6 partial storages, as indicated in FIGURE 4 by the 6 leads djn emanating from the block designated Dn. It is emphasized that the arrangement shown in FIGURE 4 represents a variation of the supervisory section shown in FIGURE 3, which variation is not to be considered in connection with FIGURE 1, since the block diagram in FIGURE 1 relates o a system for establishing one-to-one connections.

The input-gating circuit WT is only opened upon application of the clock pulses tkd, when the respective unit has been called via the line mn, and only upon opening of the gate WT will the AND-gates ZT be opened, thus permitting the setting of the partial storage marker TM. Directly with the setting of the partial storage marker the connecting-through of the desired connection is effected.

The partial storage marker TM remains set as long as information is to be transmitted between the respective unit and the partial storage which is designated or identified by the partial storage marker. Subsequent to the transmission of the information the partial storage marker, as will be described hereinafter, will be restored to normal via a release line 1n. The release the 1n is connected with the sequence control ASn of the respective unit. By restoring the partial storage marker, the partial storage itself will again be set free for cooperating with other-units.

On the output side, the individual storage cells of the partial storage marker TM are connected with corresponding return-indicating lines rj (j=1–4), via decoupling diodes DR. In the discussed example of embodiment, the number of the partial storage (i.e. 1 out of j) is stored in a non-coded manner in the partial storage marker TM. The number of the input-control lines aj, the number of the storage cells TM, as well as the number of the return-indicating lines rj, accordingly, corresponds to the number of partial storages employed. Generally only one of the storage cells of the partial storage marker is marked because the respective unit cooperates only with one partial storage. However, the arrangement, according to the invention, can also be made in such a way that one of the units simultaneously cooperates with several partial storages e.g. for sorting purposes. In this case it is appropriate to provide a supervisory section Dn in the connecting-through control DS for this particular unit Wn, comprising several partial storage markers, and to connect them via an output control with the control leads djn of the crossbar switch.

A corresponding supervisory section Dn via which e.g. four partial storages can be assigned to a two-way sorting unit, is shown in FIG. 4. The supervisory section according to FIG. 4, comprises four partial storage markers TM1 through TM4, which are connected via output-gating circuits (AND-circuits) A1 through A4 and via the rectifier groups G1 through G4, with the control leads djn serving the actuation of the connecting-through devices Djn. By the action of the rectifier groups, the outputs of these output-gating circuits are coupled by means of OR-conditions. The output-gating circuits are connected via the access control leads s1 through s4 with the sequence control of the unit Wn. By means of the sequence control, and with respect to different operating cycles, the required partial storage can be connected with the unit by marking the corresponding one of the control leads s1 through s4.

The setting of the partial storage markers TM is effected, as with the other supervisory sections, via the partial-storage ceiling lines aj and the unit-calling lines mn under the control of the connecting-through clock pulses tkd. In the exemplified embodiment, as shown in FIG. 4, four unit-calling lines mn1 through mn4 are assigned to the unit Wn, so that the partial storage markers TM1 through TM4 can be set in the course of four successively following program steps. It is still to be pointed out that in this case the sequence control of the unit is to be arranged in such a way that the return-indicating line wrn will only be marked after all of the four partial storage markers have been set.

If, in the case of a coupling of one unit with only one partial storage, the setting of the partial storage to reading or writing is effected by the control unit, then it is advantageous likewise to lead the control leads ste and sta via the crossbar switch, and to mark them by the sequence control of the respective unit, whenever this unit is supposed to cooperate with several partial storages. It is still to be mentioned that, in order to save these lines, the access control of the individual partial storage, as well as the matrix control, can be designed in such a way that the changeover from reading to writing is effected via the clock-pile line tt, e.g. in that certain groups of code pulses are decoded in the device MS, or in that impulses of a different polarity are applied via the transmission line tt.

Figure 5:
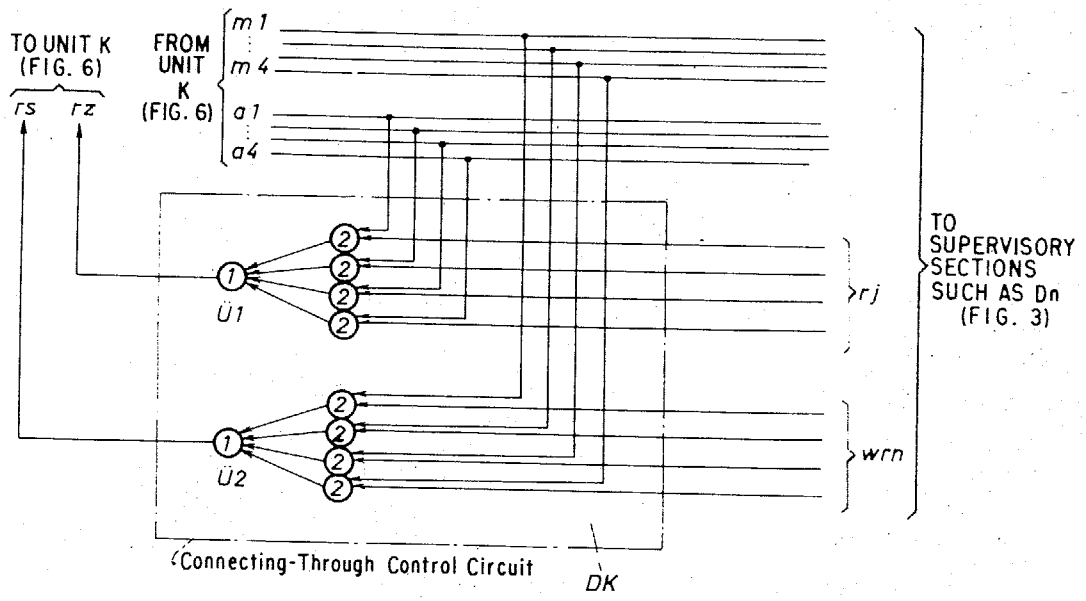
FIG. 5 shows the connecting control circuit with a supervision of the return indicating lines relating to the occupancy of the partial storage devices and units.

The set-up of the connecting-through control circuit is shown in FIG. 5. This circuit arrangement comprises a supervision Ü1 which is composed of gate circuits and is connected on one hand with the return-indicating lines rj and, on the other hand, with the input-control leads a1 through a4 of the connecting-through control, and is designed in such a way that it applies a blocking potential to the sequence-control circuit of the control unit, via a return-indicating line rz, whenever the partial storage is designated by the marking of a line aj and is still connected with one of the units. The blocking is effected because one of the AND-gates is opened or unblocked in the case of coincidence and marks the lines rz via the OR-gate which is arranged subsequently to the AND-gates.

In the same way a further supervision Ü2, is connected on one hand, via return-indicating lines wrn with the sequence controls of the units and, on the other hand, with the unit-calling lines m1 through m4, and is laid out in such a way that it applies a blocking potential to the sequence-control circuit of the control unit via a return-indicating line rs whenever the sequence control of the unit which is designated by the marking of a calling line mn is still marked.

Figure 6:
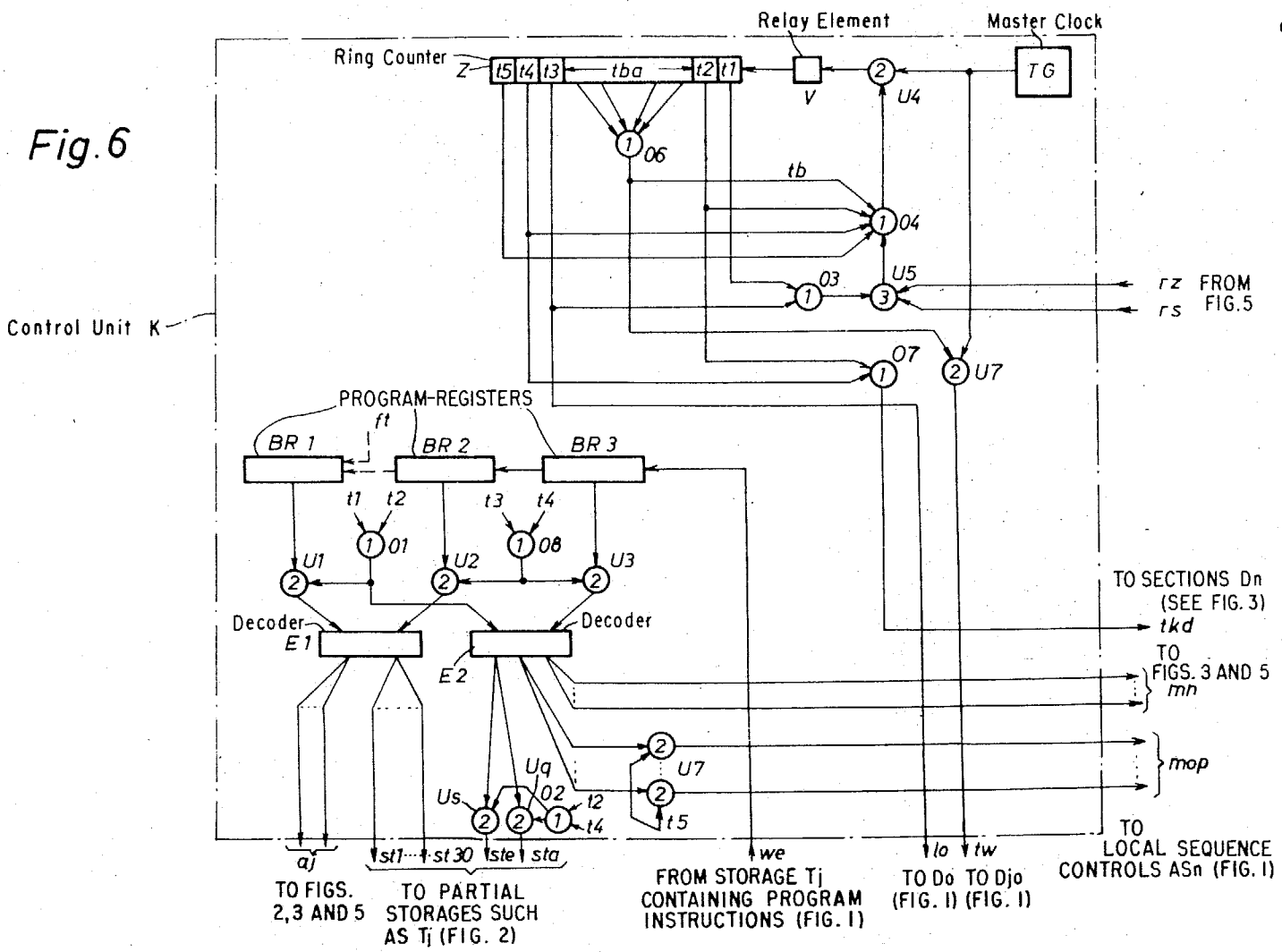
FIG. 6 shows the basic circuit diagram of the control unit.

In FIG. 6 the basic circuit diagram of a control unit is shown. For the reception of the instruction words a program register BR consisting of three parts is provided and can be connected via the input line we with a partial storage. The three sections or parts BR1, BR2 and BR3 are laid out for receiving a sequence address, an address, and an operating instruction. The sections of the program register are connected via AND-gates U1, U2, and U3 with 2 decoders E1 and E2. The decoders serve to convert the data, which is fed in a coded manner into the program register, into individual markings of the different calling and control leads. As will be described hereinafter in connection with the description of the sequence-control circuit, the connecting-through of the transmission paths from part of the program register to the decoders is controlled by the sequence control in accordance with the blocking or unblocking instructions which are supplied by the marking of the lines rz, or rs, respectively, from the connecting-through control circuit.

The decoder E1 either converts the sequence address which is stored in BR1, or the address which is stored in BR2, on the one hand, into call markings aj for the partial storage Tj which is designated by the address, and on the other hand, into the markings of the control leads st1 . . . st30 corresponding to the address. The decoder E2 is adapted to ascertain from the operational instruction the number of the unit, and correspondingly marks one of the calling lines mn. Furthermore, this decoder takes out the instruction as to whether there is concerned a writing or reading process, and then either marks the line ste or sta. In addition thereto, the marking of the desired function sequence is determined in the decoder E2 from the operational instruction which marking is indicated via one of the marking lines mop of the sequence control of the respective unit.

In the discussion above, the decoders E1 and E2 are characterized in terms of the inputs thereto and the outputs thereof, the circuit details having been omitted. Those skilled in the switching arts, however, will appreciate that such decoders comprise translating network configurations, of well understood design, which are arranged to convert signals on one or more input leads into a corresponding set of signals appearing on one output lead in each of a plurality of groups of outputs leads. Such circuits are basically well known and are described, for example, on pages 292 to 294 of the book "The Design of Switching Circuit," by W. Keister, A. E. Ritchie, S. H. Washburn, D. Van Nostrand Co., sixth edition, May 1957).

The actual sequence control consists of a master clock TG, which is connected via and AND-gate U4 with a ring counter Z, as is shown in FIG. 6. The output of a counter stage is assigned to each sequential cycle. The number of stages of the ring counter is dependent upon the length of the word whenever the informations are supposed to be transmitted in series. In the exemplified embodiment under discussion, two counter stages t1 and t2, several information reading stages tba, and three further stages t3, t4, and t5 are provided. The outputs of the counter stages are connected with a sequence-control circuit which is composed of AND-circuits and OR-circuits.

At the beginning of a program step the counter Z is set into the normal position, so that the output of the stage t1 is marked. The marking t1 opens or unblocks the OR-gate O1 and, consequently, also the AND-gate U1, so that the sequence address which is stored in BR1, is applied to the decoder E1 and, via output lines aj thereof, calls up the partial storage in which the instruction code (word), which is to be processed during this program step, is stored.

The marking t1 also opens the OR-gate $O_3$ and thereby prepares the opening of the AND-gate U5. Upon opening of U5 the gate U4 will also be unblocked, and the next clock pulse from TG will effect the stepping-on of the counter to the stage t2 via a delay element V which is arranged subsequently to U4. However, the supervisory gate U5 will only open when the connecting-through control circuit DK (FIG. 5) does not deliver a blocking signal, i.e. when the complementary signals rs and rz, which are derived via reversing stages not shown in the drawing, are applied together with the marking t1 or t3 applied via O3. Furthermore, in the position t1 and via the output of O1 the decoded E2 is also called up, which, in this particular case, effects the marking of the calling line m0 for the partial storage marker of the control unit in Do, as well as the setting-pulse line sta for the reading or sending-forward purpose. In the course of this operation the supervisory section of the connecting-through control which is assigned to the control unit occupies a special position, as the marking of m0 is without influence upon the return-indication via rs.

Upon stepping the sequence control to the counter position t2 the gate O1 will remain unblocked, so that the contents of the program register BR1 are again applied to the decoder E1. However, the control gate O2 is also unblocked by t2 and, consequently, and in dependency upon the marking by E2, one of the output gates U8 or U9 is also unblocked, whereby the setting of the respective partial storage is effected. The marking t2, via the OR-gate O4, also opens the lead-in for clock pulses via U4, so that the counter will be stepped on. At the same time, the OR-gate O7, whose output is connected with the clock-pulse line tkd for "setting" the partial storage marker is unblocked by the marking of t2.

Subsequently to the stepping-on of the counter to the first stage tba, the OR-gate O6 is unblocked, thereby unblocking, via the AND-gate U6, the output of clock pulses via the clock-pulse line tw. These clock pulses are adapted to control the matrix control MS, which has already been set during the sequential cycle t2 of the called-up partial storage. The counter of the sequence control is also stepped on by each clock pulse serving the data or information transmission, because the gate O4 is kept open via the output tb of O6 and, consequently, also gate U4. While the counter passes through the stages tba for the call-up of instructions, the program code or instruction word is stored via the information-input line we into the program register BR. In this case the number of stages tba corresponds to the number of storage cells of the register BR.

After the transmission of the instruction code has been completed, the counter will be stepped onto the position t3. By the marking of t3 via the gate O8 and the gate U2, the address, as stored in the register BR2, is applied to the decoder E1, and via the gate U3, the operational instuction, as stored in the register BR3, is applied to the decoder E2. In addition thereto, the erasing of the partial storage markers in DO is effected by the marking t3 via the release line 1o of the control unit, because the transmission of the instruction code has already been completed.

Via the outputs aj of the decoder E1, and mn of the decoder E2, the partial storage as marked or designated by the instruction is called, as well as the likewise designated unit. The blocking signals which are thereupon likely to be transmitted by the connecting-through control circuit will then block the AND-gate U5 whenever the partial storage or the unit is occupied. If the establishment of the connection is permitted by the connecting-through control circuit DK, then the gate U5 and, consequently, U4 will open, so that thereupon the counter will be stepped on to position t4.

The marking of t4 will again open the gates O2 and O7, thereby permitting the setting of both the access control and the partial storage marker. Since t4, via O4, also opens or unblocks the gate U4, the counter Z will be stepped on to t5. The final sequential cycle of the progrom step is thus attained. The marking of t5 will then open the AND-gate U7 and will effect the connecting-through of the corresponding outputs of the decoder E2 to the marking line mop for setting the sequence control of the called unit. At the same time, t5 will effect the opening or unblocking of the gates O4 and U4, so that by the next successive clock pulse from the master clock, the counter of the sequence control of the control unit will jump back into its normal position, thus permitting the start of the next step of the program.

Summarizing the above sequence of events in terms of system effects, with counter Z of control unit K (FIGURE 6) in its initial state, or position, t1, a code representation stored in register BR1 is translated into markings of one output line of the group aj and one output line of the group st1 . . . st30, via the decoder E1. Simultaneously, via decoder E2, the output of counter stage t1 is translated into a marking of the line mo of the group mn, which line extends to supervisory section Do (FIGURE 1) of the central control K, and into similar markings of selected leads in each of the groups of output leads feeding the gates U7, U8, and U9. Upon the occurrence of the next master clock pulse, counter Z will step to position t2 providing that the line selected from the group aj is not occupied. This will usually be the case because of the arrangement of the main connecting program.

With counter Z of control unit K in position t2 the conditions manifested for counter position t1 are repeated, and in addition the lines tkd and sta (FIGURES 2, 3, and 6) are marked, thereby establishing a cross-point connection between the registers BR1 to BR3 of control unit K and the partial storage Tj containing the next program instruction.

Upon occurrence of the next master clock pulse, counter Z proceeds to step through the sequence of positions tba under the control of the master clock pulses, and transfer control signals are applied via line tw and the cross-point connection established in the preceding counter step, to the addressed partial storage Tj, in rhythm with the stepping of the counter. The transfer control signals advance the next program instruction into the registers BR1–BR3, the information thus stored including a next control address (register BR1), an address code (register BR2), and an address and instruction code (BR3) respectively indicating the partial storage and working unit Wn which are to be connected, and the transfer operation (read/write) to be initiated between such connected units.

When the counter arrives at position t3, the connection via Do, between central control system K and the partial store containing the program instruction word, is terminated via the signal on lead 1o, while simultaneously signals in registers BR2 and BR3 are being translated, via decoding networks E1 and E2, respectively, into a marking of a selected line in each of the groups a and mn, respectively. The supervisory section Dn (FIGURE 3), corresponding to the marked lead mn, then determines the condition of the signals rs and rz (FIGURES 5 and 6), and thereby controls the further advance of the counter Z of control unit K (FIGURE 6). Briefly reviewing the function of these signals, if either the called partial storage tj or the addressed working unit Wn are occupied at the time of occurrence of signals aj and mn, respectively, during interval t3, the counter will be prevented from advancing until such time as the marker TM, of supervisory section Dn (FIGURE 3) is reset via line 1n, and until the marker WM of the working unit Wn (FIGURE 3) is reset. Upon the occurrence of such resetting the counter Z advances, the position t4 whereupon lead tkd (FIGURES 3 and 6) is marked, thereby setting TM (FIGURE 3), and the outputs of decoders E1 and E2, translated during counter position t3, are repeated. Additionally one of the lines ste, sta, is marked to designate the type of transfer connection (read/write) which is to be established. Referring to FIGURE 2 it is seen that this sets up the local controls MS and ZW of the selected partial storage Tj for subsequent read-in or read-out of data, between the selected storage and the selected working unit, under control of local control signals Wt to be forwarded by the access control ASn of the selected working unit Wn.

The operation of the local access control ASn occurs as follows. At the next master clock pulse the central control unit counter Z (FIGURE 6) steps to position t5 establishing a signal mark on one of the leads mop which transfers control of the connection established during counter position t4 to the local access control ASn. The counter thereupon resets to position t1 upon occurrence of the next master clock pulse and the control unit is then ready to begin a new programmed cycle of operation to establish a connection between another working unit and another partial storage.

From the above it should be appreciated that the system of this invention basically functions as a revertive control system in which connections are set up by the central control unit and the control of each such connection is thereupon given over to a local or secondary control unit ASn, freeing the central control unit to imitate other connections as required by the program. It will be appreciated that the structural organization of the secondary controls ASn will depend upon the function and structure of the corresponding units Wn.

In the described embodiment of the invention, it has been assumed that the other of succession with respect to the processing of the instructions is determined by the sequence address. On the other hand, it is also possible to determine the order of sequence in which the individual instructions are supposed to be carried out by the order of succession of their positions within the program register (e.g. partial storage T1). In this case it is superfluous that the instruction code carries a sequence address. Accordingly, as program registers (instruction register), only the parts or sections BR1 and BR2 have to be provided and the latter parts are then no longer connected with BR1, as is denoted by the dashlines in FIG. 6. Instead of the register sections BR1 for the sequence or successive address, a control sequence counter BR1 is then provided which is stepped on by one step during each step of the program by the action of a stepping-clock pulse ft. This stepping-clock pulse can only be derived from the stages t3 through t5 of the counter Z.

In the hitherto described example it has been presupposed that the information is transmitted in series via the crossbar switch. However, in a system according to the invention, it is also possible to design the crossbar switch to be suitable for a parallel transmission. In this case, each unit and each partial storage will have to have a corresponding plurality of information-transmission lines, which are simultaneously connected-through under the control of the respective partial storage marker.

In various data-processing systems it is desirable that individual units or partial storages can be connected among each other. For this reason it appears to be of advantage to provide further line or horizontal lines in the crossbar switch which are connected with each other in pairs, serving the connection of the units among each other, or further column or vertical lines likewise connected among each other in pairs and serving to connect two partial storages to each other. For the purpose of enabling a better understanding, it is assumed that in the system, according to FIG. 1, instead of the partial storages T3 and T4, a direct connection exists between the third and the fourth horizontal line wires. In this case, the unit W1 can be connected with the unit W4 in that by a first instruction the partial storage marker is set in D1 by the calling line a3, and the partial storage marker in D4 by the calling line a4. The connection between W1 and W4 will then extend via the vertical column wires of W1, via the horizontal line wires of T3 and T4, and via the vertical column wires of W4.

What is claimed is:

1. An electronic data-processing system comprising a central program control unit, a data-processing unit, backing-storage units, input, and output units, a working storage subdivided into a plurality of partial storages, electronic crossbar switch means capable of providing simultaneous direct connections between any of said partial storages and any of said units, a separate sequence control assigned each unit, means in said control unit for marking each said sequence control in accordance with a desired sequence of functions, and means in each sequence control for causing said sequence control to assume control of the operation of its associated unit, following a connection of said associated unit to one of said partial storages through said switch means by said control unit.

2. An electronic system, as claimed in claim 1, further comprising a separate access control for each partial storage, and means for setting said access controls in accordance with desired addresses within said partial stores.

3. An electronic system, as claimed in claim 2, in which the partial storages comprise magnetic-core storage matrices.

4. An electronic system, as claimed in claim 3, further comprising means for producing control pulses, means in the sequence control of the control unit for applying said control pulses to the access control, the access control of the partial storages comprising input control leads input-gate circuits, a calling line and a line selector, said line selector being settable only in accordance with the marking of input-control leads of the access control of a partial storage whenever a calling line associated with this partial storage has been marked and when a control pulse from said control pulse producing means has been applied to it.

5. An electronic system, as claimed in claim 4, further comprising a stepping device in said access control, and means for causing said stepping device, subsequently to the writing or reading from the storage matrix to effect the stepping-on of the line selector to the next successive address within said storage matrix.

6. An electronic system, as claimed in claim 1, further comprising information transmission lines assigned to the partial stores and the units and means for producing clock pulses in the control unit, said means having output lines each carrying different clock pulses, the crossbar switch being designed as a multiswitch for effecting the connection of one of said clock-pulse output lines and of at least one of said information transmission lines between a partial store and a unit.

7. An electronic system, as claimed in claim 6, further comprising information input and output and clock pulse lines for the units, information input and output and clock-pulse lines for the partial storages, said crossbar switch being designed as a triple switch for effecting the connecting-through of the information output line of a unit to the information-input line of a partial storage, for effecting the connecting-through of the information output line of a partial storage to the information-input line of a unit, and for effecting the connecting-through of a clock-pulse transmission line of a unit to the clock transmission line of a partial storage.

8. An electronic system, as claimed in claim 1, in which only one line or column wire is provided in the crossbar switch for each unit and only one line or column wire is provided for each partial storage, means in the sequence control of the units for producing clock pulses, and means in the matrix control of the partial storages and producing clock pulses.

9. An electronic data processing system comprising a central program control unit, backing storage units, a data processing unit, input and output units, a separate sequence control for each of said units, a working storage subdivided into a plurality of partial storages, a separate access control for each partial storage, means controlled by said central program control unit for respectively coupling any of said units and the associated sequence control to any of said partial storages and the respective access control, and means in said central program control unit for controlling the conditioning of said access control of the respective partial storage to enable said sequence control of said coupled unit to control the transfer of data signals between said coupled partial storage and said coupled unit via said coupling means and said respective access control.

10. An electronic data-processing system comprising a central program control unit, backing storage units, a data processing unit, input and output units, a separate sequence control for each of said units, a working storage subdivided into a plurality of partial storages, a separate access control for each partial storage, means in said central program control unit for controlling the conditioning of said access control of the respective partial storage to afford access thereto independently of said control unit, means under the control of said control unit for selectively coupling said units to said partial storages, and means for releasing the desired sequence of functions by marking the sequence control in the respective unit, further means comprising a program register subdivided into several sections for receiving, storing, and releasing operating instructions, addresses, and sequence addresses.

11. An electronic system, as claimed in claim 10, further comprising control leads extending from said control unit, decoders in the central program control unit for converting addresses and operating instructions into marking potentials, and means for applying said marking potentials to said control leads.

12. An electronic system as claimed in claim 11, wherein said selectively coupling means includes an electronic crossbar switch for establishing connections between any partial store and any unit, a connecting-through control and a connecting-through circuit to control said electronic crossbar switch, means for causing cooperation between said connecting-through control, connecting-through control circuit, and the sequence control circuit of the control unit to prevent the connection between any busy unit and any busy partial storage.

3. An electronic system, as claimed in claim 12, in which the sequence control of the control unit is connected with a sequence-control circuit said sequence-control circuit comprising blocking and unblocking arrangement for marking the sequence control of the respective unit and setting the access control in the respective partial storage device.

14. An electronic system, as claimed in claim 13, further comprising means for producing a sequence clock pulse, a supervisory section, assigned each unit, comprising input gate circuits and a partial storage marker, said partial-storage marker being settable only by the marking of the associated unit and a simultaneous sequence-clock pulse from said pulse producing means.

15. An electronic system, the supervisory section as claimed in claim 14, further comprising a plurality of decoupling diodes, return indicating leads connected to said decoupling diodes, the partial storage markers having individual storage cells the outputs of which are connected with corresponding return-indicating lines via said decoupling diodes.

16. An electronic system, as claimed in claim 15, further comprising input control leads for the connecting through control in which the connecting-through control comprises a supervision composed of gate circuits, connected on one hand, with the return-indicating lines, and on the other hand, with the input control leads of the connecting-through control, said connecting-through control comprising means for applying a blocking potential via a return-indicating line to the sequence-control circuit of the control unit, whenever the partial storage, which is designated by the marking of a line, is still connected with one of the units.

17. An electronic system, as claimed in claim 16 further comprising unit calling lines from the control input, in which said connecting-through control comprises a further supervision comprising inputs for said unit calling lines and gate circuits, said connecting-through control being connected, via return-indicating lines, with the sequence controls of the units and with the unit-calling lines, and comprising means for applying a blocking potential, via a return-indicating line, to the sequence-control circuit of the control unit whenever the sequence control of the unit, which is designated by the marking of a calling line, is still marked.

18. An electronic system, as claimed in claim 15, further comprising an erase pulse lead connected to the pulse producing means for receiving an erase pulse therefrom, the sequence controls of the control units being respectively connected, via said control lead for erase pulses, with the respective partial-storage markers.

19. An electronic system, as claimed in claim 18, further comprising means in the sequence control for marking the control lead for erasing the partial-storage marker immediately after the information transmission has been completed.

20. An electronic system, as claimed in claim 13, in which the sequence control comprises a master timing device, a ring counter connected therewith via an AND-gate and a time-delay element, and means for causing said ring counter, to step by one step in response to the clock pulses from said master timing device, upon unblocking of said AND-gate.

21. An electronic system, as claimed in claim 20, in which the ring counter has two counter stages, several information-reading stages, and three further stages, the outputs of said stages being connected with a sequence-control circuit comprising AND-circuits or OR-circuits.

22. An electronic data-processing system comprising a plurality of partial storages; a plurality of operating units including data processing units, input and output units, and a central program control unit; crossbar switch means capable of providing simultaneous connections between any of said partial storages and any of said units; means coupled to said switch means, said units, and said partial storages for selectively establishing a connection through said switch means between an idle one of said units and a selected address in an idle one of said partial storages; and a plurality of sequence control means individually assigned to said units for taking over control of the further operation of said one of said units, said one of said partial storages, and the said connection therebetween following the said establishing of the said connection, whereupon said central program control unit is free to immediately initiate the establishment of another connection in association with another program step.

23. An electronic data processing system comprising a plurality of partial storages; a plurality of operating units including data processing units, input and output units, and a central program control unit; first means coupled between said central control unit and said partial storages for selecting an address in one of said storages; second means operated in association with said first means coupled between said contral control unit and said partial storages for specifying a transfer operation to be performed in relation to said address selected by said first means; third means operated in association with said first means and coupled to said units and said storages for connecting any idle one of said units and any idle one of said storages under the control of said central control unit, and sequence control means associated with each said unit for taking over the further control of said connected unit and storage and the said connection therebetween following the establishment of the said connection, whereupon said central program control unit is free to immediately initiate the establishment of another connection in association with another program step.

24. An electronic data processing system comprising a plurality of partial storages; a plurality of working units adapted to operate upon data signals of the kind stored in said partial storages; means interposed between said working units and said partial storages for establishing selective transfer connections therebetween; a central program control unit which is cyclically operative to examine program instructions stored in a predetermined one of said partial storages and to set up a transfer connection via said connection establishing means between at least one of said partial storages and at least one of said working units in accordance with each said examined program instruction; and means individually associated with said working units under the control of said central control unit for seizing and independently maintaining control of each said transfer connection set up by said control unit while said control unit proceeds to excute the next cycle of program instruction examination.

*25. A channel status checking and switching system comprising first storage means for holding an address of a selected one of a plurality of first channels, second storage means for holding an address of a selected one of a plurality of second channels, first decoding means responsive to said first and second storage means for simultaneously determining a nonbusy status of a selected first and second channel, said first decoding means providing a first connection signal when neither of a pair of selected channels is busy, and a switch matrix including a first plurality of individual switching units interposed between respective pairs of said first and second channels, said individual switching units being responsive to first connection signals to interconnect respective pairs of selected first and second channels.*

*26. A channel status checking and switching system as defined in claim 25 further comprising a first plurality of address storing devices, each storing the addresses of a different selected pair of first and second channels which are interconnected by one of said individual switching units, said first decoding means also being responsive to said first plurality of address storing devices.*

*27. A channel status checking and switching system for interconnecting selected pairs of m first channels and n second channels comprising at two dimensional switch matrix including $m \times n$ normally open individual switches, said first channels being connected to the m dimension of said matrix and said second channels being connected to the n dimension of said matrix, a plurality of bistable storage devices, means coupling each of said individual switches to corresponding ones of said bistable storage devices, means for selectively placing each of said storage devices in a set condition to close an individual switch coupled thereto and interconnect a pair of first and second channels, register means for holding the addresses of a selected first and a selected second channel to be interconnected, coincidence means responsive to said register means and to said storage devices to produce an output signal when either of said selected first and second channels is connected to a closed switch, gate means connected to the output of said coincidence means, and means to sample simultaneously said gate means to indicate first channel and second channel nonbusy status.*

References Cited

The following references, cited by the Examiner, are of record in the patented file of this patent or the original patent.

UNITED STATES PATENTS

| | | |
|---|---|---|
| 2,604,262 | 7/1952 | Phelps. |
| 2,869,111 | 1/1959 | Young. |
| 2,945,211 | 7/1960 | Gibson. |
| 3,286,240 | 11/1966 | Thompson. |

PAUL J. HENON, Primary Examiner

R. F. CHAPURAN, Assistant Examiner